United States Patent

Imamura et al.

(10) Patent No.: US 10,505,205 B2
(45) Date of Patent: Dec. 10, 2019

(54) TITANIUM PRODUCT, SEPARATOR, AND PROTON EXCHANGE MEMBRANE FUEL CELL, AND METHOD FOR PRODUCING TITANIUM PRODUCT

(71) Applicant: NIPPON STEEL & SUMITOMO METAL CORPORATION, Tokyo (JP)

(72) Inventors: Junko Imamura, Tokyo (JP); Yoshitaka Nishiyama, Tokyo (JP); Yasuhiro Masaki, Tokyo (JP); Jun Maki, Tokyo (JP); Shunsuke Taniguchi, Tokyo (JP); Hideya Kaminaka, Hyogo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 148 days.

(21) Appl. No.: 15/554,272

(22) PCT Filed: Mar. 3, 2016

(86) PCT No.: PCT/JP2016/056580
§ 371 (c)(1),
(2) Date: Aug. 29, 2017

(87) PCT Pub. No.: WO2016/140306
PCT Pub. Date: Sep. 9, 2016

(65) Prior Publication Data
US 2018/0047997 A1    Feb. 15, 2018

(30) Foreign Application Priority Data

Mar. 3, 2015 (JP) ................. 2015-040939
Jul. 13, 2015 (JP) ................. 2015-139865
Jan. 4, 2016 (JP) ................. 2016-000165

(51) Int. Cl.
*H01M 8/0206* (2016.01)
*C23C 8/12* (2006.01)
(Continued)

(52) U.S. Cl.
CPC ............ *H01M 8/0206* (2013.01); *C23C 8/12* (2013.01); *C23C 22/34* (2013.01); *C23C 28/04* (2013.01);
(Continued)

(58) Field of Classification Search
None
See application file for complete search history.

(56) References Cited

U.S. PATENT DOCUMENTS

2009/0211667 A1    8/2009  Suzuki et al.
2010/0233587 A1    9/2010  Sato et al.

FOREIGN PATENT DOCUMENTS

EP    2 061 111       5/2009
JP    11-162479       6/1999
(Continued)

OTHER PUBLICATIONS

Suzuki et al., "Decrease of Contact . . . Heat-treatment After Pickling", Titanium Japan, Oct. 2006, vol. 54, No. 4, p. 259.
(Continued)

*Primary Examiner* — Wyatt P McConnell
(74) *Attorney, Agent, or Firm* — Clark & Brody (57) ABSTRACT

A titanium product for a separator of a proton exchange membrane fuel cell according to the present invention includes: a base material that consists of commercially pure titanium; a first oxide layer that is formed in a surface layer of the titanium product, consists of $TiO_2$ of a rutile crystallinity, and has a thickness of 0.1 to 1.5 nm; and a second oxide layer that is formed between the base material and the first oxide layer, consists of $TiO_x$ (1<x<2), and has a thick-
(Continued)

ness of 3 to 20 nm. This titanium product is suitable to be used as a separator of a proton exchange membrane fuel cell that has a high corrosion resistance in an environment in a fuel cell, is capable of keeping a low contact resistance with an electrode consisting of carbon fiber and the like, and is inexpensive.

10 Claims, 4 Drawing Sheets

(51) Int. Cl.
    *C23C 22/34* (2006.01)
    *C23C 28/04* (2006.01)
    *H01M 8/10* (2016.01)
    *H01M 8/0202* (2016.01)
    *H01M 8/0215* (2016.01)
    *H01M 8/0228* (2016.01)
    *H01M 8/1004* (2016.01)
    *H01M 8/1018* (2016.01)

(52) U.S. Cl.
    CPC ....... *H01M 8/0202* (2013.01); *H01M 8/0215* (2013.01); *H01M 8/0228* (2013.01); *H01M 8/10* (2013.01); *H01M 8/1004* (2013.01); H01M 2008/1095 (2013.01); Y02P 70/56 (2015.11)

(56) References Cited

FOREIGN PATENT DOCUMENTS

| | | |
|---|---|---|
| JP | 2003-105523 | 4/2003 |
| JP | 2006-190643 | 7/2006 |
| JP | 4032068 | 1/2008 |
| JP | 2009-228123 | 10/2009 |
| JP | 2009-238438 | 10/2009 |
| JP | 4367062 | 11/2009 |
| JP | 2010-238394 | 10/2010 |
| JP | 2014-192039 | 10/2014 |
| RU | 2180977 | 3/2002 |
| RU | 2404488 | 11/2010 |
| WO | 03/026052 | 3/2003 |
| WO | 2008/041560 | 4/2008 |

OTHER PUBLICATIONS

Michinori Oki et al., "Chemical Dictionary", Tokyo Kagaku Dojin, Oct. 20, 1989, p. 2526-2527 with English concise explanation.

TITANIUM PRODUCT, SEPARATOR, AND PROTON EXCHANGE MEMBRANE FUEL CELL, AND METHOD FOR PRODUCING TITANIUM PRODUCT

TECHNICAL FIELD

The present invention relates to a titanium product for a separator of a proton exchange membrane fuel cell, a separator including the titanium product, and a proton exchange membrane fuel cell including the separator, and relates to a method for producing a titanium product.

BACKGROUND ART

Fuel cells use energy generated in the binding reaction between hydrogen and oxygen to generate electric power. From this nature, fuel cells are expected to be introduced and popularized in terms of both energy saving and environmental friendliness. The types of the fuel cells include solid electrolyte, molten carbonate, phosphoric acid, proton exchange membrane, and other types.

Of these types, proton exchange membrane fuel cells have high power density and provide an opportunity to downsize. In addition, the proton exchange membrane fuel cells operate at temperatures lower than those at which other types of fuel cells operate, and are easy to start up and stop. With such advantages, the proton exchange membrane fuel cells are expected to be used for automobiles and small-sized cogeneration for home use and have particularly received attention in recent years.

Figure 1A:
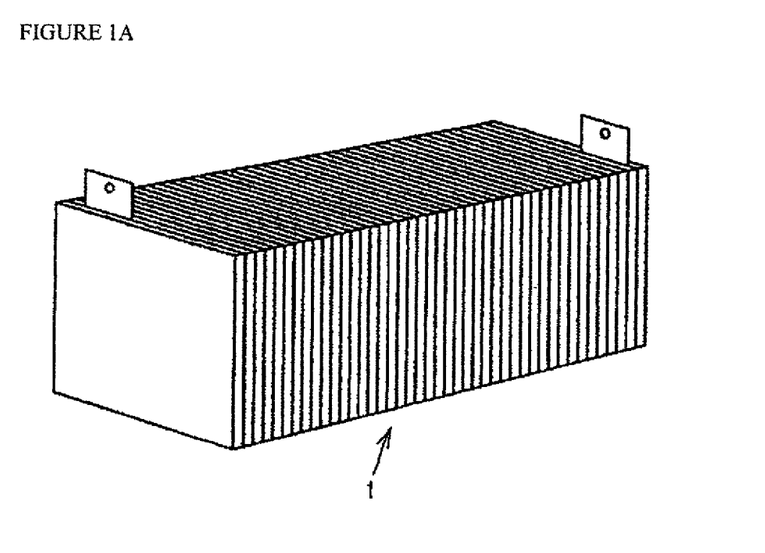
FIG. 1A is a perspective view of a proton exchange membrane fuel cells.
Figure 1B:
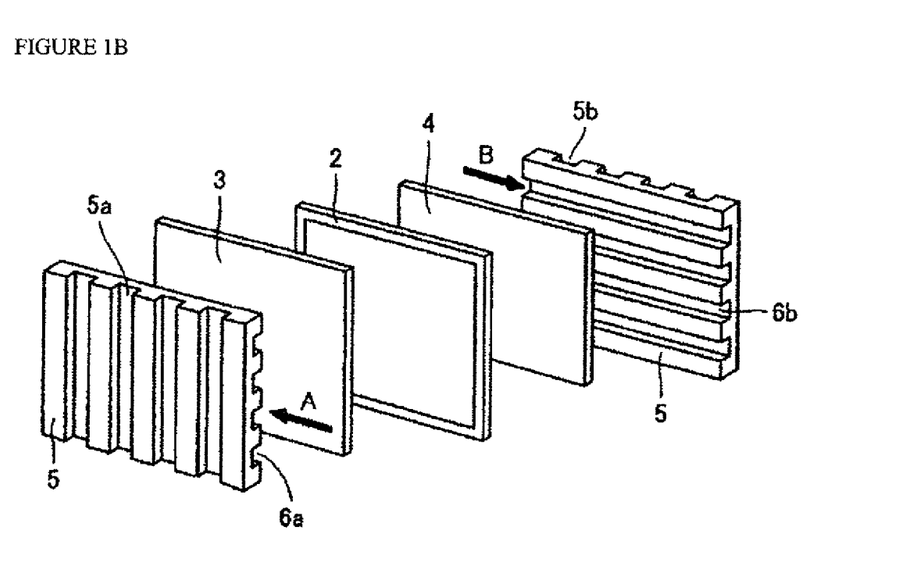
FIG. 1B is an exploded perspective view illustrating the structure of a single cell constituting the proton exchange membrane fuel cell.

FIG. 1A is a perspective view of a proton exchange membrane fuel cell (hereinafter, simply also referred to as a "fuel cell"), illustrating the entire fuel cell made up of a combination of a plurality of single cells. FIG. 1B is an exploded perspective view of a single cell constituting the fuel cell.

As illustrated in FIG. 1A, a fuel cell 1 is a set (stack) of single cells. In each single cell, as illustrated in FIG. 1B, on one surface of a proton exchange membrane 2, an anode-side gas diffusion electrode layer (also called a "fuel electrode film"; hereinafter, referred to as an "anode") 3 is arranged. On the other surface of the proton exchange membrane 2, a cathode-side gas diffusion electrode layer (also called an "oxidant electrode film"; hereinafter, referred to as a "cathode") 4 is arranged. On both surfaces of the stacked body, separators (bipolar plates) 5a and 5b are arranged.

Examples of the fuel cells include a water-cooled fuel cell in which a separator having a distribution channel for cooling water is arranged between two adjacent single cells or for several single cells. The present invention also covers a titanium product for a separator of such a water-cooled fuel cell.

As the proton exchange membrane (hereinafter, simply referred to as an "electrolyte membrane") 2, a fluorine-based proton conducting membrane having a hydrogen-ion (proton) exchange group is mainly used.

The anode 3 and the cathode 4 are each made up principally of a carbon sheet that is consisted of carbon fibers having good conductivity into a sheet shape (or a sheet of carbon paper thinner than the carbon sheet, or a piece of carbon cloth still thinner than the carbon sheet). The anode 3 and the cathode 4 are each provided with a catalyst layer in some cases. The catalyst layer consists of a particulate platinum catalyst, graphite powder, and as necessary, a fluororesin having a hydrogen-ion (proton) exchange group.

In this case, this catalyst layer comes into contact with a fuel gas or an oxidative gas to promote the reaction.

On a surface of the separator 5a on the anode 3 side, groove-shaped channels 6a are formed. Through these channels 6a, a fuel gas (hydrogen or a hydrogen-contained gas) A is caused to flow, so as to supply hydrogen to the anode 3. On a surface of the separator 5b on the cathode 4 side, groove-shaped channels 6b are formed. Through these channels 6b, an oxidative gas B such as air is caused to flow, so as to supply oxygen to the cathode 4. The supply of these gasses causes an electrochemical reaction to generate DC power.

The main functions required for separators of proton exchange membrane fuel cells are as follows.

(1) The function as a "channel" for uniformly supplying a fuel gas or an oxidative gas to the inside of a cell surface.
(2) The function as a "channel" for efficiently discharging water generated on the cathode side from the fuel cell out of the system, together with carrier gasses such as air after the reaction, and oxygen.
(3) The function of serving as a path of electricity by being in contact with an electrode film (the anode 3, cathode 4), and further serving as an electrical "connector" between two adjacent single cells.
(4) The function as a "partition wall" between adjacent cells, between an anode chamber of one cell and a cathode chamber of the adjacent cell.
(5) In a water-cooled fuel cell, the function as a "partition wall" between a cooling water channel and an adjacent cell.

The substrate material of a separator used for a proton exchange membrane fuel cell (hereinafter, simply referred to as a "separator") needs to be one that can fulfill such functions. The substrate material is roughly categorized into a metal-based material and a carbon-based material.

A separator consisting of a carbon-based material is produced by the following method, for example.

Method in which a graphite substrate is impregnated with a thermosetting resin such as a phenol-based thermosetting resin and a furan-based thermosetting resin for hardening, and baked.

Method in which carbon powder is mixed with a phenolic resin, a furan resin, a tar pitch, or the like, subjected to press molding or mold injection into a plate shape, and baked to be a glassy carbon.

Using a carbon-based material has an advantage of obtaining a lightweight separator, but involves a problem of having gas permeability, and a problem of a low mechanical strength.

As the metal-based material, titanium, stainless steel, carbon steel, or the like is used. A separator consisting of one of these metal-based materials is produced by press working or the like. The metal-based material is excellent in formability as an intrinsic characteristic of metals. This allows the reduction of the thickness of a separator, so as to achieve weight reduction of the separator.

However, the conductivity of the surface of a separator consisting of a metal-based material may decrease over time. Such a decrease in conductivity occurs due to the oxidation of the surface of the separator. In addition, under an environment containing fluorine (e.g., an environment in which fluorine is supplied from an electrolyte membrane containing fluorine), the conductivity of the surface of the separator also decreases by a fluoride generated due to corrosion of the surface of the separator. This causes a problem of a possible increase in contact resistance between a separator consisting of a metal-based material and gas diffusion layers (an anode and a cathode). To solve this problem, the following measures are proposed.

Patent Document 1 proposes that, in a titanium separator substrate, a passivation film is removed from a surface to come into contact with an electrode, and thereafter the surface is plated with a noble metal such as gold. However, using a noble metal in a large quantity raises a problem from the viewpoints of economic efficiency and restriction of resources. The proton exchange membrane fuel cells are expected to be widely used as fuel cells for mobile objects and stationary fuel cells. Employing the method of Patent Document 1 for producing separators for proton exchange membrane fuel cells results in use of a noble metal in a large quantity. For this reason, the method of Patent Document 1 does not come into widespread use.

Patent Document 2 proposes a titanium alloy in which a rise in contact resistance is suppressed by pickling a titanium alloy that contains one, or two or more kinds of platinum group elements to concentrate the platinum group elements on the surface of the titanium alloy. Patent Document 3 proposes a titanium separator in which a platinum group element is concentrated on the surface of the separator by pickling, and the surface is thereafter subjected to heat treatment under a low-oxygen-concentration atmosphere for the purpose of improving the adhesiveness between the platinum group element concentrated on the surface and a matrix. However, both separators contain platinum group elements and require many steps in production, and thus a significant rise in cost is inevitable.

For this reason, Patent Document 4 describes the attempt to solve the problems described above without using a noble metal. Specifically, a method is proposed in which a conductive contact layer consisting of carbon is formed on a titanium surface of a metallic separator by vapor deposition on the surface.

Patent Document 5 proposes a method in which a conductive ceramic is dispersed on a separator surface to reduce a contact resistance.

Patent Document 6 discloses a titanium plate material that is formed with a titanium substrate layer and a surface layer. The surface layer includes a titanium layer in which a compound is intermixed with Ti (metallic titanium) containing O (oxygen), C (carbon), and N (nitrogen) dissolved. The formed compound includes Ti and one or more kinds of O, C, and N. Patent Document 6 describes that the presence of the titanium layer under an outermost layer or a passivation film of the titanium plate material provides a surface with a reduced contact resistance.

Patent Document 7 discloses a separator material for fuel cells in which an oxidized layer is formed between a Ti substrate and a Au layer or a Au alloy layer at a thickness of 5 to 30 nm, the oxidized layer containing 20% by mass or more of O.

LIST OF PRIOR ART DOCUMENTS

Patent Document

Patent Document 1: JP2003-105523A
Patent Document 2: JP2006-190643A
Patent Document 3: JP4032068B
Patent Document 4: JP4367062B
Patent Document 5: JP11-162479A
Patent Document 6: JP2014-192039A
Patent Document 7: JP2010-238394A Non Patent Document Non-Patent Document 1: TITANIUM JAPAN, vol. 54, No. 4, p. 259

SUMMARY OF INVENTION

Technical Problem

Normally, on the surface of titanium, a non-conductive titanium oxide layer is formed. Thus, even when a conductive contact layer is formed, the contact resistance does not decrease. Therefore, in the case of employing the method according to Patent Document 4, in order to decrease the contact resistance, it is necessary to form a conductive contact layer immediately after removing the titanium oxide layer described above, therefore a significant rise in cost is inevitable.

In the method according to Patent Document 5, when a material obtained in the form of a plate member is subjected to press forming into a separator shape, the dispersed ceramic inhibits the formability. As a result, a crack or a penetrating hole may occur in the separator during working. In addition, the ceramic wears a pressing die, which entails the use of a pressing die of an expensive material such as a cemented carbide alloy. Because of these problems, the method according to Patent Document 5 falls short of practicing use.

On the titanium product according to Patent Document 6, since a portion of metallic titanium where a compound is not formed is active, it is difficult to keep the corrosion resistance of this titanium plate material in an environment in a fuel cell irrespective of the presence/absence of a passivation film. Furthermore, the titanium product according to Patent Document 6 is obtained by subjecting a cold rolling material to heat treatment. In the surface of the cold rolling material, elements such as C and N are often present. For this reason, even when the conductivity of the titanium product is assumed to be high, the corrosion resistance is low unless appropriate surface treatment is performed.

Patent Document 7 describes how to increase the thickness of an atomic oxidized layer by anodic oxidation on a titanium product, and this titanium product is considered to have conductivity to some extent but low corrosion resistance because appropriate surface treatment is not performed.

An objective of the present invention is to solve the aforementioned problems of prior art and to provide a titanium product for a separator of a proton exchange membrane fuel cell that has a high corrosion resistance in an environment in a fuel cell, is capable of keeping a low contact resistance with an electrode consisting of carbon fiber and the like, and is inexpensive.

A further objective of the present invention is to provide a separator of a proton exchange membrane fuel cell that has a high corrosion resistance in an environment in a fuel cell, is capable of keeping a low contact resistance with an electrode consisting of carbon fiber and the like, and is inexpensive.

A further objective of the present invention is to provide a proton exchange membrane fuel cell that is excellent in initial power generating performance, suffers a little degradation in power generating performance, and is inexpensive.

A still further objective of the present invention is to provide a method for producing a titanium product for a separator of a proton exchange membrane fuel cell that has a high corrosion resistance in an environment in a fuel cell, is capable of keeping a low contact resistance with an electrode consisting of carbon fiber and the like, and is inexpensive.

Solution to Problem

The gist of the present invention resides in a titanium product according to the following (A), a separator according to the following (B), a proton exchange membrane fuel cell according to the following (C), and a method for producing a titanium product according to the following (D).

(A) A titanium product for a separator of a proton exchange membrane fuel cell, the titanium product including:

a base material, a first oxide layer, and a second oxide layer, wherein the base material consists of a commercially pure titanium, the first oxide layer is formed in a surface layer of the titanium product, consists of $TiO_2$ of a rutile crystallinity, and has a thickness of 0.1 to 1.5 nm, and the second oxide layer is formed between the base material and the first oxide layer, consists of $TiO_x$ ($1<x<2$), and has a thickness of 3 to 20 nm.

(B) A separator for a proton exchange membrane fuel cell, the separator including the titanium product according to (A).

(C) A proton exchange membrane fuel cell including the separator according to (B).

(D) A method for producing a titanium product, the method including:

a solution treatment step which is treating a substrate consisting of a commercially pure titanium is treated using an aqueous solution containing fluoride ions;

a first heat treatment step which is subjecting the substrate treated in the solution treatment step to heat treatment under a low-oxygen-partial-pressure atmosphere having an oxygen partial pressure of 0.1 Pa or less, at 200 to 550° C., for 10 to 300 minutes; and a second heat treatment step which is subjecting the substrate treated in the first heat treatment step to heat treatment under a high-oxygen-partial-pressure atmosphere having an oxygen partial pressure of 10000 Pa or more, at 200 to 500° C., for 2 to 30 minutes.

Advantageous Effects of Invention

In this titanium product, the first oxide layer consists of a titanium oxide of a rutile crystallinity the chemical formula of which is expressed as $TiO_2$. $TiO_2$ substantially has no conductivity as an intrinsic characteristic of the substance. However, the first oxide layer has a thickness of 0.1 to 1.5 nm, which is sufficiently thin to the extent that the thinness substantially does not inhibit the conductivity between an electrode to come in contact with the surface of this titanium product, and the second oxide layer. In addition, the second oxide layer present between the first oxide layer and the base material consists of a titanium oxide the chemical formula of which is expressed as $TiO_x$ ($1<x<2$). $TiO_x$ ($1<x<2$) has conductivity.

For this reason, when the titanium product according to the present invention is used as a separator of a proton exchange membrane fuel cell, the contact resistance between the titanium product and an anode or a cathode (electrodes consisting of carbon fiber) can be reduced. This titanium product may further include at least one of a noble metal layer and a conductive carbon material layer formed on the first oxide layer. Also in this case, the contact resistance between the titanium product and the anode or cathode can be reduced.

In addition, the presence of the first oxide layer in the surface layer inhibits the second oxide layer from being oxidized into an oxide being rutile-crystallinity $TiO_2$. For this reason, the contact resistance of this titanium product is kept low. In the case where this titanium product includes at least one of the noble metal layer and the conductive carbon material layer formed on the first oxide layer, at least one of the noble metal layer and the conductive carbon material layer further inhibits the oxidation of the second oxide layer, keeping the contact resistance of this titanium product low.

Therefore, a proton exchange membrane fuel cell including the separator is excellent in initial power generating performance and suffers a little degradation in power generating performance.

Furthermore, for the titanium product according to the present invention, use of an expensive material such as a platinum group element is not necessary. Even in the case of not providing the noble metal layer, it is possible to secure a sufficient performance for a separator of a fuel cell. For this reason, the titanium product, the separator, and the proton exchange membrane fuel cell according to the present invention can be inexpensive. Even in the case of providing the noble metal layer, the amount of a noble metal to be used can be a trace amount, and it is possible to make a rise in cost slight in comparison with the case of not providing the noble metal layer. Furthermore, even in the case of providing the conductive carbon material layer, a conductive carbon material to be used is not expensive, and in addition, the amount of the conductive carbon material to be used can be a trace amount, and it is possible to make a rise in cost slight in comparison with the case of not providing the conductive carbon material layer.

By the method for producing a titanium product according to the present invention, it is possible to produce the titanium product described above. In this producing method, the first oxide layer is formed through the heat treatment in the second heat treatment step. Formed by the heat treatment, the first oxide layer becomes dense and has higher corrosion resistance than a natural oxide film.

This method for producing a titanium product may further include, after performing the solution treatment step, the noble metal layer forming step in which a noble metal is supplied to the surface of the substrate to form a noble metal layer. In this case, it is possible to produce a titanium product including the noble metal layer.

In addition, this method for producing a titanium product may further include, after performing the solution treatment step, the conductive carbon material layer forming step in which carbon is supplied to the surface of the substrate to form a conductive carbon material layer. In this case, it is possible to produce a titanium product including the conductive carbon material layer.

DESCRIPTION OF EMBODIMENTS

1. Titanium Product According to Present Invention
<Relationship Between Shifted Energy Value by EELS and Conductivity>

The present inventors calculated shifted energy value at the $L_2$ edge of Ti (hereinafter, simply referred to as "shifted energy value") for a surface layer of a titanium product including an oxide film, by the electron energy loss spectroscopy (EELS) using a spectral device supplied with a transmission electron microscope (TEM). The shifted energy value is calculated with reference to the energy of metallic titanium and has a correlation with x of $TiO_x$ ($1<x\leq2$).

Figure 2A:
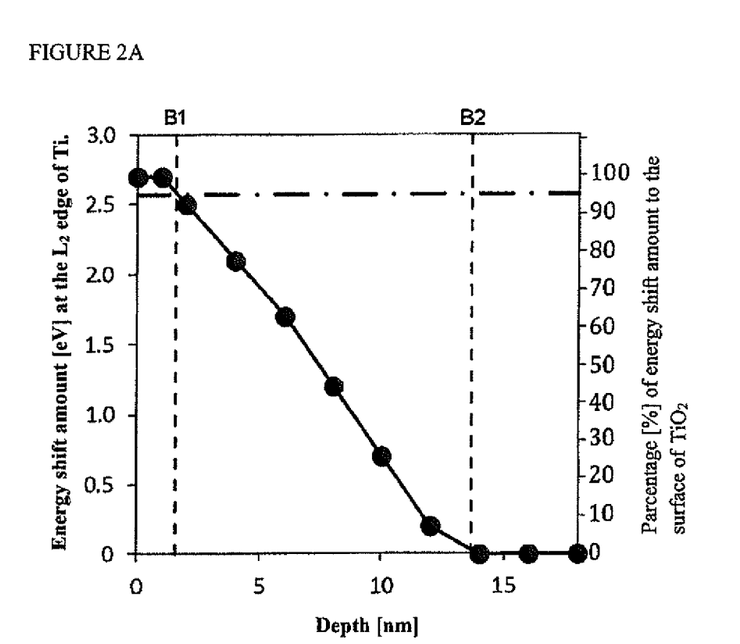
FIG. 2A is a graph illustrating an example of the relationship between depth from the surface of a titanium product, and shifted energy value at the $L_2$ edge of Ti.
Figure 2B:
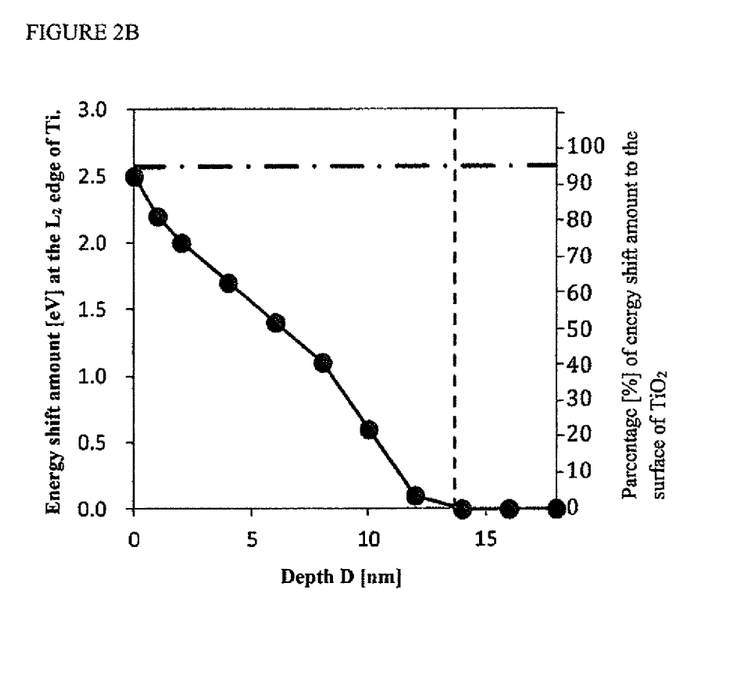
FIG. 2B is a graph illustrating an example of the relationship between depth from the surface of a titanium product before a second heat treatment step, and shifted energy value at the $L_2$ edge of Ti.

FIG. 2A illustrates an example of the relationship between depth from the surface of a titanium product and shifted energy value. FIG. 2B is a graph illustrating an example of the relationship between depth from the surface of a titanium product before a second heat treatment step, which will be described later, and shifted energy value at the $L_2$ edge of Ti. The titanium product of the example has the following features. The titanium product includes neither noble metal layer nor conductive carbon material layer formed on the titanium product.
(i) The shifted energy value shown in an outermost layer of the titanium product is that of $TiO_2$.
(ii) From the surface, the shifted energy value starts to decrease toward a deep portion up to 1.5 nm.
(iii) From the start of the decrease in shifted energy value up to a base material, the shifted energy value shows that of $TiO_x$ ($1<x<2$), where the value of x of $TiO_x$ corresponding to the shifted energy value approaches two as coming close to an outer layer side and approaches one as coming close to a base material side.

The present inventors have found that the titanium product having the features (i) to (iii) shows a low contact resistance.

The conductivity of $TiO_x$ varies in proportion to the value of x and therefore varies in proportion to the shifted energy value. When the shifted energy value of $TiO_x$ ($1<x<2$) falls below 90% of the shifted energy value of $TiO_2$ in the outermost layer, a loss amount of oxygen increases, which results in a high conductivity. The smaller the value of x is, the smaller the value of n of a Magneli phase becomes, which is expressed as $Ti_nO_{2n-1}$ (n: an integer not less than one), and the conductivity increases. The reason that the titanium product having the features (i) to (iii) shows a low contact resistance is supposed to be attributable to such a relationship between an oxygen loss amount and conductivity.

The present invention is completed based on the aforementioned findings. The titanium product according to the present invention includes a base material, a first oxide layer that is formed in a surface layer of the titanium product, and a second oxide layer that is formed between the base material and the first oxidized layer. The titanium product may further include at least one of a noble metal layer and a conductive carbon material layer that are formed on the first oxide layer.

[Base Material]

The base material consists of commercially pure titanium. Examples of the commercially pure titanium include Type 1 to 4 titaniums that are specified in JIS H 4600:2014. Hereinafter, the commercially pure titanium will be simply referred to as "pure titanium".

[First Oxide Layer]

Where neither noble metal layer nor conductive carbon material layer is formed, the first oxide layer is located in the outermost-layer portion of the titanium product.

The first oxide layer has a thickness of 0.1 to 1.5 nm and consists of a titanium oxide of a rutile crystallinity the chemical formula of which is expressed as $TiO_2$. When the ratio of $TiO_2$ in the first oxide layer is lowered, the first oxide layer becomes unable to exert an expected effect (described later). Consequently, the ratio is preferably 90% by mass or more, more preferably 95% by mass or more.

A reduced thickness of the first oxide layer results in a low corrosion resistance and a failure to sufficiently inhibiting the second oxide layer, which is a lower layer, from advancing in oxidation to turn into $TiO_2$. For this reason, the thickness of the first oxide layer is set at 0.1 nm or more, and is preferably 0.3 nm or more.

An increased thickness of the first oxide layer results in a low conductivity between an electrode to come in contact with the surface of the titanium product, and the second oxide layer. Consequently, the thickness of the first oxide layer is set at 1.5 nm or less, and is preferably 1.3 nm or less.

The surface of the first oxide layer (the surface of the titanium product) may be flat or may be provided with projections, for example, those which are 1.5 μm or less in height. Where projections are provided on the surface, even if a layer having no conductivity is formed on the first oxide layer, such projections help the first oxide layer with obtaining electrical contact with an electrode (a conductive member constituting an anode and a cathode).

The first oxide layer is formed in the second heat treatment step. The first oxide layer is a layer that is a crystallized surface of an amorphous coating film layer formed in a first heat treatment step. For this reason, the interface between the first oxide layer and the second oxide layer can be recognized as an X-ray diffraction pattern by TEM observation. Forming the crystallized first oxide layer in such a manner improves a corrosion resistance in a fuel cell environment.

[Second Oxide Layer]

The second oxide layer has a thickness of 3 to 20 nm and consists of a titanium oxide the chemical formula of which is expressed as $TiO_x$ ($1<x<2$). When the ratio of $TiO_x$ in the second oxide layer is lowered, the conductivity of the second oxide layer becomes low with some component of the balance of $TiO_x$. Consequently, the ratio is preferably 90% by mass or more, more preferably 95% by mass or more.

A reduced thickness of the second oxide layer results in a high conductivity (a low electric resistance) between the first oxide layer and the base material. Consequently, the thickness of the second oxide layer is set at 20 nm or less. The thickness of the second oxide layer is preferably 17 nm or less, more preferably 15 nm or less. The smaller the thickness of the second oxide layer, the better. However, it is difficult to make the thickness of the second oxide layer less than 3 nm in the presence of the first oxide layer. The thickness of the second oxide layer may be 5 nm or more.

[Noble Metal Layer]

The noble metal layer need not be formed. The noble metal layer contains one, or two or more kinds of gold (Au), silver (Ag), and the platinum group elements (ruthenium (Ru), rhodium (Rh), palladium (Pd), osmium (Os), iridium (Ir), and platinum (Pt)), as main components. The ratio of these elements to the noble metal layer is preferably 80% by mass or more, more preferably 90% by mass or more.

Assume here that, with respect to the area of the surface of the first oxide layer, a "coverage of the noble metal layer" is defined as the ratio of the area of a portion that is of the surface of the first oxide layer and covered with the noble metal layer. When the coverage of the noble metal layer is intended to be set at 98% or more, a large quantity of noble metals is to be used, which leads to a rise in cost as well as the risk that, in an environment in a fuel cell, corrosion occurs concentratedly in a portion of the surface of the first oxide layer that is not covered with the noble metal layer. To inhibit the rise in cost and the concentrated corrosion of the first oxide layer, the coverage is set at less than 98% when the noble metal layer is to be formed. The coverage of the noble metal layer may be 50% or less, for example, 2%.

[Conductive Carbon Material Layer]

The conductive carbon material layer need not be formed. The conductive carbon material layer contains a carbon material having conductivity, as a main component. Examples of the conductive carbon material include graphite and amorphous carbon. The conductive carbon material is preferably graphite. This is because a surface that shows a good conductivity with graphite particles is likely to be oriented in a certain direction, and the conductive carbon material layer shows a good conductivity in the direction. In addition, a graphite having a C-plane distance d002 of 3.38 Å or less has a high purity of carbon, providing a good conductivity. For this reason, a graphite having such a plane distance is suitable as a substance that makes up the conductive carbon material layer.

The ratio of carbon to the conductive carbon material layer is preferably 80% by mass or more, more preferably 90% by mass or more.

Assume here that, with respect to the area of the surface of the first oxide layer, a "coverage of the conductive carbon material layer" is defined as the ratio of the area of a portion that is of the surface of the first oxide layer and covered with the conductive carbon material layer. When the coverage of the conductive carbon material layer is intended to be set at 98% or more, there is the risk that, in an environment in a fuel cell, corrosion occurs concentratedly in a portion of the surface of the first oxide layer that is not covered with the conductive carbon material layer. To inhibit the concentrated corrosion of the first oxide layer, the coverage of the conductive carbon material layer is set at less than 98%. The coverage of the conductive carbon material layer may be 50% or less, for example, 2%.

On the first oxide layer, both of the noble metal layer and the conductive carbon material layer may be formed. In this case, to the area of the surface of the first oxide layer, the ratio (coverage) of the area of a portion that is of this surface covered with at least one of the noble metal layer and the conductive carbon material layer is set at less than 98%. This coverage may be 50% or less, for example, 2%.

[Effect of Titanium Product according to Present Invention]

Corrosion resistance is obtained by forming the first oxide layer in the surface layer of the base material (pure titanium), the first oxide layer consisted of $TiO_2$ of a rutile crystallinity, and by causing the first oxide layer to have a thickness of 0.1 nm or more.

A passivation film that is formed on the surface of the base material (pure titanium) as a natural oxide film consists of $TiO_2$, and a pure titanium with this film formed thereon has a high contact resistance. One of the reasons of this is that the thickness of the passivation film is as large as 5 to 10 nm. In contrast, the thickness of the first oxide layer in the present invention is as small as 1.5 nm or smaller. Therefore, due to the tunnel effect and the like, a high conductivity is obtained between an electrode in contact with the surface of the first oxide layer, and the second oxide layer.

Figure 3A:
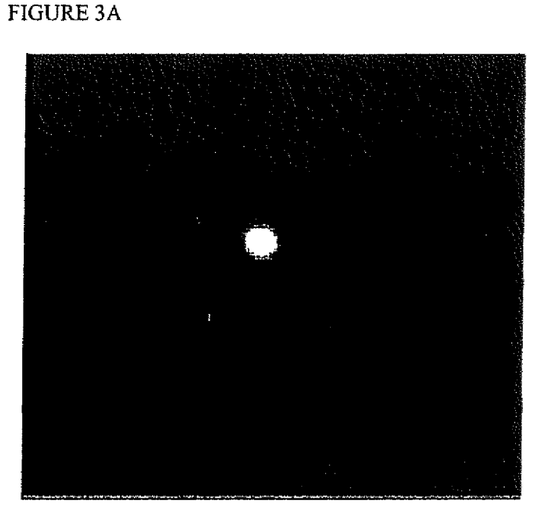
FIG. 3A is a picture illustrating an example of an X-ray diffraction pattern obtained by TEM observation on the surface of the titanium product before the second heat treatment step.

FIG. 3A is a picture illustrating an example of an electron beam diffraction pattern obtained by TEM observation on the surface of the titanium product before the second heat treatment step.

Figure 3B:
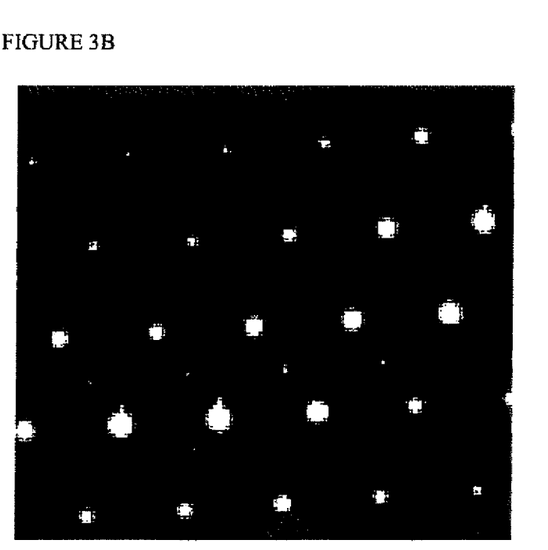
FIG. 3B is a picture illustrating an example of an X-ray diffraction pattern obtained by TEM observation on the surface of the titanium product after the second heat treatment step.

FIG. 3B is a picture illustrating an example of an electron beam diffraction pattern obtained by TEM observation on the surface of the titanium product after the second heat treatment step.

[Thicknesses of First and Second Oxide Layers]

The thicknesses of the first and second oxide layers can be determined based on the relationship between depth from the surface of the titanium product and shifted energy value measured by the EELS (see FIG. 2A), and based on a TEM image. It is assumed that the shifted energy value is measured by the EELS in a portion where neither noble metal layer nor conductive carbon material layer is present. It is noted that the first oxide layer is not formed before the second heat treatment step, as illustrated in FIG. 2B.

In the present invention, the boundary between the first oxide layer and the second oxide layer is set at a depth position at which the shifted energy value is 95% of the shifted energy value of $TiO_2$ (hereinafter, referred to as a "first boundary", illustrated by a broken line B1 in FIG. 2). Meanwhile, the second oxide layer and the base material can be discriminated from each other on a TEM image because their crystalline structures are different from each other. In other words, since the second oxide layer and the base material differ in contrast (shade of gray) on a TEM image, the boundary between the second oxide layer and the base material (hereinafter, referred to as a "second boundary") can be determined based on the TEM image. The second boundary is also a depth position at which the shifted energy value comes down, from the surface side, to zero (illustrated by a broken line B2 in FIG. 2).

The thickness of the first oxide layer is defined as the distance between the surface of the titanium product and the first boundary. The thickness of the second oxide layer is defined as the distance between the first boundary and the second boundary.

2. Method for Producing Titanium Product According to Present Invention

The present inventors have found that removing an oxide film of a substrate consisted of pure titanium using a hydrochloric acid aqueous solution or a fluonitric acid aqueous solution, which is used in usual pickling for titanium, and thereafter treating a titanium oxide film that is formed (recovered) on a surface of this substrate using an aqueous solution containing fluoride ions (passivation treatment) make the titanium oxide film have conductivity. The method for producing a titanium product according to the present invention is completed based on this finding.

The method for producing a titanium product according to the present invention includes a solution treatment step, the first heat treatment step, and the second heat treatment step. In the case of producing a titanium product that includes the noble metal layer, the method for producing a titanium product according to the present invention includes a noble metal layer forming step. In the case of producing a titanium product that includes the conductive carbon material layer, the method for producing a titanium product according to the present invention includes a conductive carbon material forming step. Each step will be described below in detail.

[Solution Treatment Step]

In this step, a substrate consisted of pure titanium is treated by an aqueous solution containing fluoride ions.

As the aqueous solution containing fluoride ions, use can be made of an aqueous solution having a concentration of fluoride ions within a range of, for example, 0.05 to 1.5% by mass (if the aqueous solution contains a plurality of kinds of fluoride ions, the concentration of the kinds of fluoride ions is 0.05 to 1.5% by mass). The temperature of the treatment can be set at, for example, 20 to 40° C. The time period of the treatment can be set at, for example, 2 to 30 minutes. The treatment under such conditions can impart conductivity to a titanium oxide film.

The aqueous solution containing fluoride ions may contain a component other than the fluoride ions. This aqueous solution may be an aqueous solution in which, for example, 0.5% by mass of HF, 0.5% by mass of NaF, 0.5% by mass of NaCl, and 0.5% by mass of $HNO_3$ are dissolved.

In the case of forming projections on the surface of the titanium product to be produced (the surface of the first oxide layer), such projections can be formed by, in the solution treatment step, extending the time period of the treatment using the aqueous solution containing fluoride ions within an appropriate range, for example.

The substrate to be treated in the solution treatment step may be, for example, subjected to rolling processing. In this case, it is preferable to, prior to the solution treatment step, subject this substrate to pickling for removing an oxide film formed in the rolling, for example, using a HF aqueous solution or a $HNO_3$ aqueous solution at a high concentration (e.g., 3% by mass or more).

[Noble Metal Layer Forming Step]

In the case of producing a titanium product that includes the noble metal layer, the performance of the first arid second heat treatment steps is followed by the performance of the noble metal layer forming step in which noble metals is supplied on the surface of the substrate to form a noble metal layer. The method for forming the noble metal is not limited in particular, and methods such as plating and vapor deposition can be employed. In any of the methods, it is preferable to shorten the time period of the treatment to reduce a weight per unit area so that the coverage of the noble metal layer is less than 98%. This allows cost reduction. In the case of producing a titanium product that includes no noble metal layer, the noble metal layer forming step is not performed.

[Conductive Carbon Material Layer Forming Step]

In the case of producing a titanium product that includes the conductive carbon material layer, the performance of the first and second heat treatment steps is followed by the performance of the conductive carbon material layer forming step in which carbon is supplied on the surface of the substrate to form a conductive carbon material layer. The method for forming the conductive carbon material layer is not limited in particular, and methods such as adhesion by sliding and application can be employed. In any of the methods, the time period of the treatment can be shortened by setting the coverage of the conductive carbon material layer at less than 98%. In the case of producing a titanium product that includes no conductive carbon material layer, the conductive carbon material layer forming step is not performed.

As the method for forming the conductive carbon material layer, adhesion by sliding is preferably employed. In the adhesion by sliding, when a conductive carbon material is graphite particles, these particles are normally scale-like and oriented in a given direction efficiently. For this reason, a good adhesiveness of these particles to the substrate is obtained, and a resultant titanium product is likely to have a low contact resistance. The formation of the carbon material layer by the adhesion by sliding can be performed by bringing the substrate and the conductive carbon material into contact with each other, and moving at least one of the substrate and the conductive carbon material with the contact therebetween kept.

[First Heat Treatment Step]

In this step, the substrate treated in the solution treatment step is subjected to heat treatment under a low-oxygen-partial-pressure atmosphere having an oxygen partial pressure of 0.1 Pa or less, at 200 to 550° C., for 10 to 300 minutes. This step increases the loss amount of oxygen in the titanium oxide film, further increasing the conductivity of the titanium oxide film. As will be described later, the second oxide layer is formed mainly through the first heat treatment step. For this reason, it is preferable that the oxygen loss amount in the titanium oxide film substantially satisfies $TiO_x$ ($1<x<2$) after the performance of the first heat treatment step.

The low-oxygen-partial-pressure atmosphere can be, for example, what is called an "oxygen-free atmosphere", namely a vacuum (reduced-pressure) atmosphere, or an inert gas atmosphere such as argon atmosphere.

The first oxide layer is formed in the second heat treatment step. The first oxide layer is a layer that is a crystallized surface of an amorphous coating film layer formed in a first heat treatment step. For this reason, the interface between the first oxide layer and the second oxide layer can be recognized as an electron beam diffraction pattern by TEM observation. Forming the crystallized first oxide layer in such a manner improves a corrosion resistance in a fuel cell environment.

The heat treatment time period is set within a range of 10 to 300 minutes, although depending on the heat treatment temperature. An excessively short heat treatment time period fails to increase the oxygen loss amount in the titanium oxide film sufficiently. On the other hand, an excessively long heat treatment time period results in a saturated effect of increasing the conductivity. The higher the heat treatment temperature is, the shorter the heat treatment time period can be. The lower the heat treatment temperature is, the longer the heat treatment time period needs to be. When the heat treatment temperature is 200° C., the heat treatment time period can be, for example, set at 200 to 300 minutes. When the heat treatment temperature is 550° C., the heat treatment time period can be, for example, set at 10 to 30 minutes.

[Second Heat Treatment Step]

In this step, the substrate treated in the first heat treatment step is subjected to heat treatment under a high-oxygen-partial-pressure atmosphere having an oxygen partial pressure of 10000 Pa or more, at 200 to 500° C., for 2 to 30 minutes. The high-oxygen-partial-pressure atmosphere can be, for example, air atmosphere. This step forms the first oxide layer consisting of $TiO_2$ of a rutile crystallinity, on the surface layer of the titanium oxide film that is present after the performance of the first heat treatment step. The rest of the titanium oxide film serves as the second oxide layer. Since $TiO_2$ of a rutile crystallinity is formed in this producing method, the first oxide layer is dense, has high mechanical strength, and has high resistance to corrosion in an environment in which fluorine ions are present and in an environment in which voltage is applied.

The known titanium oxides are anatase, rutile, and brookite, and in general, when heated to 650 to 900° C. or more, turn into rutile titanium oxide, which is the most stable. Although the second heat treatment according to the present application is performed at 200 to 500° C., the surface of the titanium oxide turns into the rutile titanium oxide. The reason for this is unclear, but it is speculated that the rutile-crystallinity titanium oxide is generated because the formed rutile titanium oxide has a thickness as small as 1.5 nm.

A heat treatment temperature of less than 200° C. results in a failure to form a sufficiently oxidized film. For this reason, the heat treatment is supposed to be performed at 200° C. or more, preferably 300° C. or more. On the other hand, a heat treatment temperature of more than 500° C. results in an excessively advanced oxidation, as well as a loss of density of the titanium oxide film. Consequently, the heat treatment is supposed to be performed at 500° C. or less, preferably 450° C. or less.

The heat treatment time period is set within a range of 2 to 30 minutes, although depending on the beat treatment temperature. An excessively short heat treatment time period fails to secure a thickness of the first oxide layer of 0.1 nm or more. An excessively long heat treatment time period results in an excessively advanced oxidation, failing to suppress the thickness of the first oxide layer to 1.5 nm or less. The higher the heat treatment temperature is, the shorter the heat treatment time period can be. The lower the heat treatment temperature is, the longer the heat treatment time period needs to be. When the heat treatment temperature is 200° C., the heat treatment time period can b; for example, set at 20 to 30 minutes. When the heat treatment temperature is 500° C., the heat treatment time period can be, for example, set at 2 to 10 minutes.

As seen from the above, by two-stage heating: heating under the low-oxygen-partial-pressure atmosphere and heating under the high-oxygen-partial-pressure atmosphere, it is possible to form the first oxide layer that is thin to the extent that the thinness does not inhibit the conductivity (a thickness of 1.5 nm or less), and that has high corrosion resistance.

The second heat treatment step may be performed on the substrate treated in the first heat treatment step and comes to a temperature of less than 200° C. (e.g., room temperature) and performed, for example, in a different furnace to which the substrate is conveyed. In addition, the second heat treatment step may be performed on the substrate treated in the first heat treatment step and comes to a temperature of 200° C. or more, and performed without temperature drop, for example, in the same furnace at the atmosphere of which is changed to different one.

EXAMPLE

To confirm the effect of the present invention, samples of titanium products were fabricated by the following method and were evaluated.

1. Fabrication of Titanium Products

Prepared titanium plates (foils) were those which had been rolled to a thickness of 0.1 mm and thereafter annealed. Each of the titanium plates was subjected to press working so as to include groove-shaped gas channels having a width of 2 mm and a depth of 1 mm formed on both surfaces (an anode side and a cathode side) thereof, and thereby became ready to be used as a separator.

After the press working, every titanium product was subjected to the surface treatment using acid, the heat treatment under the low-oxygen-partial-pressure atmosphere, and the heat treatment under the high-oxygen-partial-pressure atmosphere. Table 1 shows materials used (types of titanium products as base materials (types specified in JIS H 4600)) and heat treatment conditions.

TABLE 1

| Number | Types specified in JIS H 4600 | First oxide layer thickness (nm) | Second oxide layer thickness (nm) | Noble metal kind/coverage of noble metal layer (%) | Coverage of conductive carbon material layer (%) | Heat treatment under low-oxygen-partial-pressure atmosphere Temperature (° C.) | Heat treatment under low-oxygen-partial-pressure atmosphere Time (min) | Heat treatment under high-oxygen-partial-pressure atmosphere Temperature (° C.) | Heat treatment under high-oxygen-partial-pressure atmosphere Time (min) | Initial resistance (mΩ · cm$^2$) | Post-power-generation resistance property *[1] |
|---|---|---|---|---|---|---|---|---|---|---|---|
| Inventive example 1 | 1 | 0.12 | 18 | — | — | 500 | 60 | 200 | 20 | 3.8 | ○ |
| Inventive example 2 | 2 | 1.2 | 8 | — | — | 400 | 60 | 350 | 10 | 3.8 | ⊙ |
| Inventive example 3 | 1 | 0.8 | 9 | — | — | 500 | 30 | 300 | 10 | 3.3 | ⊙ |
| Inventive example 4 | 1 | 1 | 6 | — | — | 300 | 60 | 300 | 15 | 3.6 | ⊙ |
| Inventive example 5 | 2 | 0.5 | 11 | — | — | 200 | 300 | 500 | 2 | 3.5 | ○ |
| Inventive example 6 | 17 | 0.8 | 8 | — | — | 500 | 30 | 250 | 20 | 3.6 | ⊙ |
| Inventive example 7 | 1 | 0.2 | 6 | — | — | 450 | 20 | 300 | 5 | 3.5 | ⊙ |
| Inventive example 8 | 1 | 1.2 | 15 | — | — | 350 | 180 | 250 | 30 | 4 | ○ |
| Inventive example 9 | 2 | 1.1 | 12 | — | — | 250 | 240 | 300 | 20 | 4.1 | ⊙ |
| Inventive example 10 | 16 | 1.2 | 10 | — | — | 500 | 30 | 300 | 25 | 4.3 | ○ |
| Inventive example 11 | 17 | 1.2 | 16 | — | — | 300 | 180 | 250 | 30 | 4 | ⊙ |
| Inventive example 12 | 1 | 1.4 | 12 | — | — | 400 | 150 | 400 | 20 | 4.3 | ⊙ |
| Inventive example 13 | 2 | 0.9 | 8 | — | — | 550 | 15 | 300 | 20 | 4 | ⊙ |
| Inventive example 14 | 1 | 1.3 | 4 | — | — | 200 | 30 | 300 | 25 | 4.5 | ⊙ |
| Inventive example 15 | 1 | 0.9 | 9 | — | — | 300 | 90 | 300 | 20 | 3.7 | ⊙ |
| Inventive example 16 | 1 | 0.4 | 14 | — | — | 300 | 240 | 300 | 10 | 3.4 | ⊙ |
| Inventive example 17 | 1 | 1.2 | 12 | Au/2 | — | 250 | 15 | 300 | 10 | 3.1 | ⊙ |
| Inventive example 18 | 1 | 1.4 | 15 | Ru/20 | — | 400 | 30 | 250 | 15 | 3.2 | ⊙ |
| Inventive example 19 | 1 | 1 | 15 | Rh/5 | — | 300 | 20 | 400 | 5 | 3.3 | ⊙ |
| Inventive example 20 | 1 | 1.3 | 13 | — | 3 | 500 | 20 | 300 | 10 | 3.3 | ⊙ |
| Inventive example 21 | 1 | 1.4 | 16 | — | 40 | 400 | 40 | 250 | 15 | 3.4 | ⊙ |
| Inventive example 22 | 2 | 1.1 | 14 | — | 10 | 300 | 30 | 400 | 5 | 3.8 | ⊙ |
| Comparative example 1 | 1 | <0.1 | 8 | — | — | 500 | 30 | 300 | 1 | 3.5 | X |
| Comparative example 2 | 1 | <0.1 | 9 | — | — | 400 | 120 | 200 | 1 | 3.6 | X |
| Comparative example 3 | 1 | <0.1 | 15 | — | — | 300 | 180 | 180 | 10 | 3.8 | X |
| Comparative example 4 | 2 | 5 | 8 | — | — | 400 | 60 | 400 | 40 | 30 | — |
| Comparative example 5 | 1 | 10 | 9 | — | — | 500 | 30 | 600 | 10 | 85 | — |
| Comparative example 6 | 1 | 10 | <0.1 | — | — | 400 | 240 | 600 | 1 | 20 | — |
| Comparative example 7 | 1 | 100 | <0.1 | — | — | 400 | 240 | 600 | 60 | 500 | — |
| Comparative example 8 | 1 | 15 | <0.1 | — | — | 400 | 5 | 400 | 60 | 30 | X |
| Comparative example 9 | 1 | 100 | <0.1 | — | — | 200 | 300 | 550 | 90 | 600 | X |
| Comparative example 10 | 1 | 7 | <0.1 | — | — | 150 | 360 | 400 | 50 | 50 | X |
| Comparative example 11 | 1 | 1 | 2 | — | — | 600 | 10 | 300 | 20 | 4 | X |
| Comparative example 12 | 1 | 0.9 | <0.1 | — | — | 300 | 5 | 300 | 20 | 3.9 | X |
| Comparative example 13 | 1 | 1.3 | 1 | — | — | — | — | 300 | 10 | 6 | X |

*[1] The resistance properties were measured for separators having initial resistances of 12 mΩ cm$^2$ or less after power generation.
⊙: ≤8 mΩ · cm$^2$,
○: 8-12 mΩ · cm$^2$,
X: >12 mΩ · cm$^2$ Every titanium product was subjected to treatment using fluonitric acid as the surface treatment using acid, and thereafter treated using an aqueous solution at 30° C. in which 0.5% by mass of HF, 0.5% by mass of NaF, 0.5% by mass of NaCl, and 0.5% by mass of $HNO_3$ are dissolved, for 10 minutes. In other words, every sample was subjected to the treatment that satisfies the requirements on the solution treatment step in the method for producing a titanium product according to the present invention. Through this treatment, an oxide film having conductivity was formed on the surface of each titanium product.

Afterward, these titanium products were subjected to the heat treatment under the low-oxygen-partial-pressure atmosphere, and the heat treatment under the high-oxygen-partial-pressure atmosphere, under the conditions shown in Table 1. For the samples in inventive examples, both the heat treatment under the low-oxygen-partial-pressure atmosphere and the heat treatment under the high-oxygen-partial-pressure atmosphere satisfied the requirements on the first and second heat treatment steps in the method for producing a titanium product according to the present invention, whereas those for the samples in comparative examples did not satisfy any of these requirements.

For the sample in each inventive example, the film of formed through the first heat treatment step and the film formed through the second heat treatment step were checked. FIG. 3A and FIG. 3B illustrate an example of electron beam diffraction patterns obtained by TEM observation. The film formed through the first heat treatment step displays a ring-shaped pattern because the film is in an amorphous form, and the surface of the film was then crystallized through the second heat treatment step, displaying a spot-shaped pattern. This can explain that a layer formed through the second heat treatment step (the first oxide layer) consists of the crystal of $TiO_2$.

Some other samples (Inventive examples 17 to 19) were subjected to the noble metal layer forming step after subjected to the heat treatment under the high-oxygen-partial-pressure atmosphere. Specifically, a noble metal was supplied to the surface of each titanium product by plating to form a noble metal layer. In addition, still other some samples (Inventive examples 20 to 22) were subjected to the conductive carbon material layer forming step after subjected to the heat treatment under the high-oxygen-partial-pressure atmosphere. Specifically, graphite particles were supplied to the surface of each titanium product by the adhesion by sliding to form a graphite layer as the conductive carbon material layer. The adhesion by sliding was performed by rubbing block graphite from Mechanical Carbon Industry Co., Ltd. against the surface of each titanium product.

2. Evaluation of Titanium Products 2-1. Measurement of Thicknesses of First and Second Oxide Layers By the aforementioned method, the boundary between the first oxide layer and the second oxide layer was identified from the relationship between depth from the surface of a titanium product and shifted energy value by the EELS, and the thickness of the first oxide layer was determined. For titanium products each including a noble metal layer or a conductive carbon material layer formed thereon, their shifted energy value were measured by the EELS in a portion where these layers are absent.

In addition, by the aforementioned method, the boundary between the second oxide layer and the base material was identified from a TEM image, and from this boundary and the boundary between the first oxide layer and the second oxide layer determined by the method described above, the thickness of the second oxide layer was determined.

Table 1 also shows the thickness of the first oxide layer and the thickness of the second oxide layers for each sample. All the samples in inventive examples satisfied the requirements on the thicknesses of the first and second oxide layers in the titanium product according to the present invention, whereas no sample in comparative examples satisfied all of these requirements.

2-2. Measurement of Contact Resistance

Figure 4:
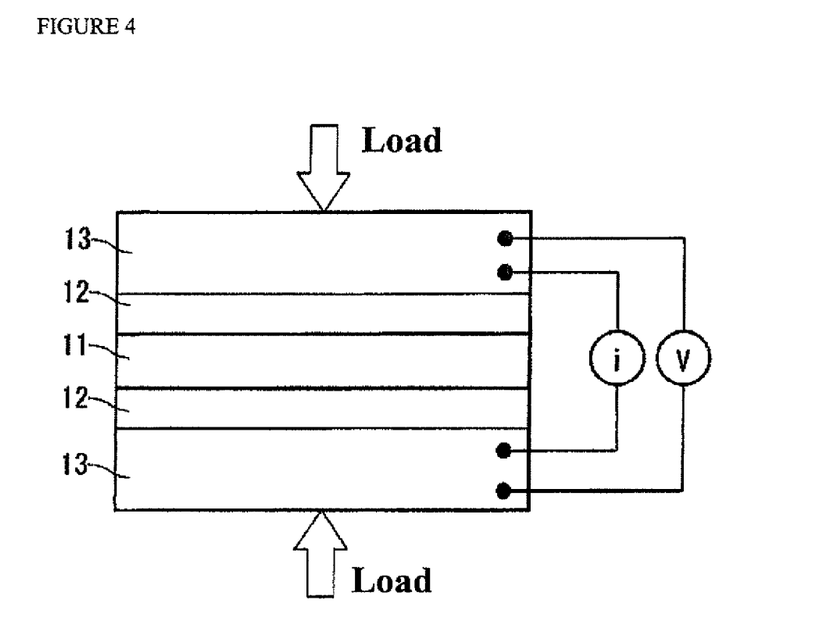
FIG. 4 is a diagram illustrating the configuration of an apparatus for measuring the contact resistance of a titanium product.

According to the method described in Non-Patent Document 1, the measurement of contact resistance was conducted on each sample using the apparatus schematically illustrated in FIG. 4. Specifically, a fabricated titanium product (hereinafter, referred to as a "titanium separator") 11 was first sandwiched between a pair of sheets of carbon paper (TGP-H-90 from Toray Industries, Inc.) 12 used in gas diffusion layers (the anode 3 and the cathode 4 in FIG. 1), which is sandwiched between a pair of gold-plated electrodes 13. Each sheet of carbon paper had an area of 1 $cm^2$.

Next, a load was applied across the pair of gold-plated electrodes 13 to generate a pressure of 10 $kgf/cm^2$ ($9.81 \times 10^5$ Pa). In this state, a constant current is caused to flow between the electrodes, and a voltage drop occurring then between the sheets of carbon paper 12 and the titanium separator 11 was measured, and based on the result of the measurement, a resistance value was determined. The resultant resistance value is a value being the sum of the contact resistances of both surfaces of the titanium separator 11, and thus the value was divided by two, which was regarded as a contact resistance value (initial contact resistance) per single surface of the titanium separator.

Next, using the titanium separator after being measured its initial contact resistance, a proton exchange membrane fuel cell was fabricated in a single cell form. The reason for employing the single cell form is that, in a multi-cell form in which single cells are stacked, the result of evaluation reflects the state of stacking. As a proton exchange membrane, FC50-MEA (membrane electrode assembly (MEA)), a standard MEA for PFECs (Nafion(R)-1135 based) from Toyo Corporation, was used.

To this fuel cell, a hydrogen gas having a purity of 99.9999% was caused to flow as an anode-side fuel gas, and air was caused to flow as a cathode-side gas. The introduction gas pressures of the hydrogen gas and the air to the fuel cell were set at 0.04 to 0.20 bar (4000 to 20000 Pa). The entire body of the fuel cell was maintained at a temperature of 70±2° C., and the humidity inside the fuel cell was controlled by setting a dew point at a gas introduction portion at 70° C. The pressure inside the cell was about one atmosphere.

This fuel cell was operated at a constant current density of 0.5 $A/cm^2$. The output voltage of the fuel cell reached its highest after a lapse of 20 to 50 hours from the start of the operation. After the output voltage had reached the highest voltage, the operation was continued for 500 hours. Afterward, a contact resistance was measured by the aforementioned method, which was regarded as a post-power-generation resistance property. Then, from the initial resistance and the post-power-generation resistance property, the corrosion resistance of the titanium separator was evaluated.

For the measurement of the contact resistance, and the measurement of the current and the voltage in the operation of the fuel cell, use was made of a digital multimeter (KEITHLEY2001 from Toyo Corporation).

Table 1 also shows the value of an initial resistance and a post-power-generation resistance property for each sample.

In Inventive examples 1 to 22, the initial resistances of the samples were all as low as 12 mΩ cm$^2$ or less. However, in the comparative examples, the initial resistances of some samples (Comparative examples 4 to 10) were as high as more than 12 mΩ cm$^2$. In the samples in Comparative examples 4 to 10, the thicknesses of the first oxide layers were more than 1.5 nm, and in some of these samples (Comparative examples 6 to 10), the thicknesses of the second oxide layers were less than 3 nm. This is considered to be a cause of high initial resistances of the samples in Comparative examples 4 to 10.

In Inventive examples 1 to 22, the post-power-generation resistance properties of the samples were all good, that is, equal to or less than 12 mΩ cm$^2$ at most, the samples in the comparative examples the post-power-generation resistance properties of which were measured (Comparative examples 1 to 3 and 11 to 13) were all more than 12 mΩ cm$^2$. Therefore, the samples in Inventive examples 1 to 22 had higher corrosion resistance than the samples in Comparative examples 1 to 3 and 11 to 13.

The fabrication conditions of the samples in Comparative examples 1 to 3 and II to 13 each included any one of the following conditions (a) to (d).

(a) The time period of the heat treatment under the low-oxygen-partial-pressure atmosphere was less than 10 minutes.
(b) The heat treatment under the low-oxygen-partial-pressure atmosphere was not performed.
(c) The treatment temperature in the heat treatment under the high-oxygen-concentration atmosphere was less than 200° C.
(d) The treatment time period in the heat treatment under the high-oxygen-concentration atmosphere was less than two minutes.

It is considered that, due to such conditions, the thicknesses of the first oxide layers became less than 0.1 nm, or even when they are 0.1 nm or more, the densities of the first oxide layers were poor. In addition, it is considered that such first oxide layers results in low corrosion resistances of the samples in Comparative examples 1 to 3 and 11 to 13.

REFERENCE SIGNS LIST

1: proton exchange membrane fuel cell
2: proton exchange membrane
3: anode
4: cathode
5a, 5b: separator

The invention claimed is:

1. A titanium product for a separator of a proton exchange membrane fuel cell, the titanium product comprising:
a base material, a first oxide layer, and a second oxide layer, wherein
the base material consists of a commercially pure titanium selected from type 1 to 4 specified in JIS H 4600:2014,
the first oxide layer is formed in a surface layer of the titanium product, consists of TiO$_2$ of a rutile crystallinity, and has a thickness of 0.3 to 1.5 nm, and
the second oxide layer is formed between the base material and the first oxide layer, consists of TiO$_x$ (1<x<2), and has a thickness of 3 to 20 nm.

2. The titanium product according to claim 1, further comprising at least one of a noble metal layer and a conductive carbon material layer formed on the first oxide layer.

3. A separator for a proton exchange membrane fuel cell, the separator comprising the titanium product according to claim 1.

4. A proton exchange membrane fuel cell comprising the separator according to claim 3.

5. A method for producing a titanium product, the method comprising the steps:
a solution treatment step which is treating a substrate consists of commercially pure titanium selected from type 1 to 4 specified in JIS H 4600:2014 using an aqueous solution containing fluoride ions;
a first heat treatment step which is subjecting the substrate treated in the solution treatment step to heat treatment under a low-oxygen-partial-pressure atmosphere having an oxygen partial pressure of 0.1 Pa or less, at 200 to 550° C., for 10 to 300 minutes; and
a second heat treatment step which is subjecting the substrate treated in the first heat treatment step to heat treatment under a high-oxygen-partial-pressure atmosphere having an oxygen partial pressure of 10000 Pa or more, at 200 to 500° C., for 2 to 30 minutes.

6. The method for producing a titanium product according to claim 5, further comprising a noble metal layer forming step which is, after performing the first and second heat treatment steps, supplying a noble metal to a surface of the titanium product to form a noble metal layer.

7. The method for producing a titanium product according to claim 5, further comprising a conductive carbon material layer forming step which is, after performing the first and second heat treatment steps, supplying carbon to a surface of the substrate to form a conductive carbon material layer.

8. A separator for a proton exchange membrane fuel cell, the separator comprising the titanium product according to claim 2.

9. A proton exchange membrane fuel cell comprising the separator according to claim 8.

10. The method for producing a titanium product according to claim 6, further comprising a conductive carbon material layer forming step which is, after performing the first and second heat treatment steps, supplying carbon to a surface of the substrate to form a conductive carbon material layer.

* * * * *